3,362,743
PAN HOLDER
August C. Purpura, Melrose Park, Ill., assignor to Bloomfield Industries, Inc., Chicago, Ill., a corporation of Delaware
Filed Sept. 27, 1965, Ser. No. 490,344
1 Claim. (Cl. 294—16)

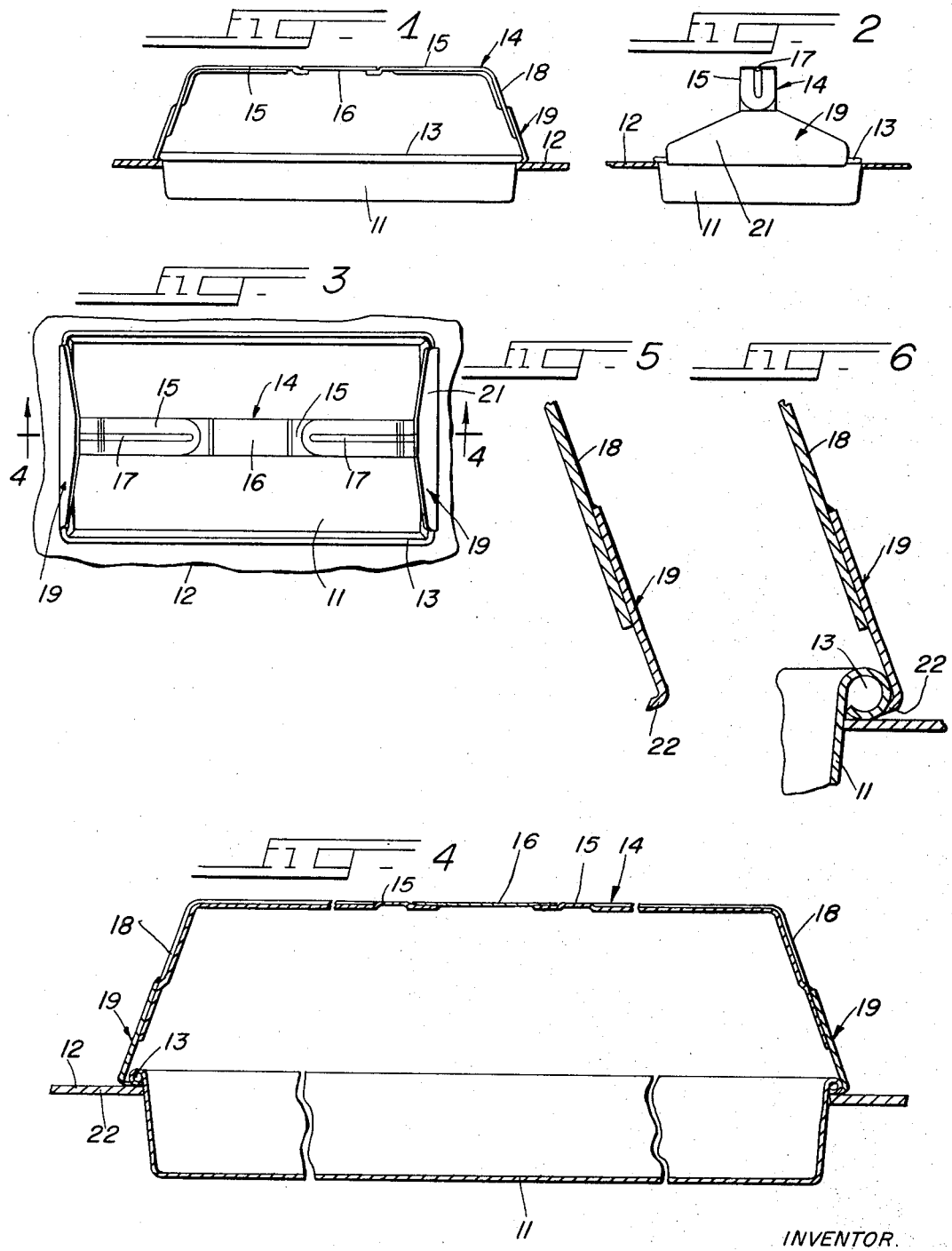

This invention relates to improvements in pan holders and is particularly concerned with a device in the form of an elongated handle which may be easily and quickly engaged with and disengaged from a pan seated in the opening of a steam table top.

Steam tables are provided with an opening in their top surface in which a pan is seated snugly. The pan, which is usually rectangular in shape, has a peripheral bead or flange on its upper perimeter which seats snugly against the margin of the table top surrounding the opening to hold the pan suspended in the opening. Considerable difficulty and inconvenience is encountered when attempting to grasp the pan for the purpose of lifting it out of the opening.

The device of the present invention is designed to overcome the problem of lifting the pan out of such opening. It comprises essentially an elongated shape-retaining strap-like body that is substantially the same length as the length of the pan and it is adapted to be held over the pan in a position to enable it to be engaged therewith. The pan holder is substantially in the shape of an inverted U having depending end portions carrying laterally extending foot portions formed on their bottom edges with inturned flanges that are engageable beneath the pan bead or flange when the device is in position of use. In order to make the device easy to attach to the pan it is formed of resilient material, in part, so that the inturned flanges can be snapped over the pan bead or flange by the application of force downwardly manually during the attachment operation. The limited resiliency of the pan holder also insures that the pan will be held firmly while being lifted out of the opening.

It is therefore an object of the invention to provide a pan holder of the character referred to.

Another object is to provide a pan holder with novel means to render it resilient in part.

Another object is to provide a strap-like pan holder with resiliently displaceable pan engaging portions.

Another object is to provide a pan holder of the character referred to which is not expensive or difficult to manufacture and one that is very efficient in its use.

The structure by means of which the above noted objects and other advantages of the invention are attained will be described in the following specification, taken in conjunction with the accompanying drawings, showing a preferred illustrative embodiment of the invention, in which:

FIG. 1 is a side elevational view of a pan having the novel holder attached thereto, showing the pan seated in an opening in a steam table top which is illustrated in section.

FIG. 2 is an end elevational view of the FIG. 1 assembly.

FIG. 3 is a top plan view of the assembly.

FIG. 4 is an enlarged longitudinal sectional view of the pan and holder, partially broken away and taken substantially on line 4—4 of FIG. 3.

FIG. 5 is an enlarged vertical sectional view of one pan engaging end of the holder.

FIG. 6 is a view similar to FIG. 5, showing the holder engaged with a pan.

Referring to the exemplary disclosure of the invention shown in the accompanying drawings, a pan 11 is shown seated in the opening in the top 12 of a steam table or the like. The pan illustrated is substantially rectangular in shape and is formed on its upper perimeter with an external bead or flange 13 which seats upon the margins of the top 12 surrounding the opening.

The pan holder, generally indicated at 14, comprises an elongated strap-like body made up of a pair of similar end straps 15, preferably of stainless steel, arranged end to end and connected integrally, as by welding, by a length of spring tempered stainless steel 16 interposed between the opposed ends of said end straps 15. The end straps 15 each may have a longitudinal stiffening rib 17 formed therein which rib terminates short of the ends of said straps 15.

The outer free end portions of said end straps 15 are each bent downwardly at an outwardly inclined angle, as at 18, and each has integrally connected thereto, as by welding, a foot portion 19. The foot portion is characterized by being formed of a substantially rectangular piece of sheet metal and it includes a laterally extending body 21 of a width greater than the width of end straps 15. It is connected midway its ends to the related end strap and has on its lower longitudinal edge an inturned flange 22 preferably coextensive in length with the foot portion 19.

In use, the pan holder is held in position above pan 11 and then is urged downwardly manually so as to cause the inturned flanges 22 to contact the bead 13 on said pan. This engagement causes initial spreading of either or both downturned end portions by reason of flexing of the intermediate spring portion 16, whereupon the inturned flanges 22 engage beneath the respective beads 13, as best shown in FIG. 6. The pan can now be lifted out of the opening by means of the holder. When lifting force is applied to the pan holder its medial portion tends to bow upwardly by reason of spring section 16 to insure firm engagement of flanges 22 beneath beads 13.

Although I have described a preferred embodiment of my invention, in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

I claim:
1. A holder for pans having a peripheral flange comprising:
an elongated handle element having a central resiliently flexible segment and a pair of rigid members connected to the opposite ends of said central segment, each of said rigid members having an obtuse angularly inclined portion at the outer end thereof, and
a rigid foot member immovably secured to each inclined end portion,
each of said foot members having an inwardly directed flange formed along its lower edge engageable with the peripheral flange of a pan on opposite sides thereof, said central segment being flexible in one direction to increase the distance between said foot members for engaging and releasing the peripheral flange of said pan and flexible in the opposite direction to decrease the distance between said foot members for more firmly engaging the peripheral flange of said pan when the pan is being carried by said holder.

References Cited

UNITED STATES PATENTS 3,301,586  1/1967  Lisiecki ---------- 294—33 X
3,262,287  7/1966  Atterbury ---------- 294—16

GERALD M. FORLENZA, *Primary Examiner.*

G. F. ABRAHAM, *Assistant Examiner.*